United States Patent [19]

Nishikawa et al.

[11] Patent Number: 5,309,233
[45] Date of Patent: May 3, 1994

[54] APPARATUS FOR CONVERTING THE SCANNING PERIOD OF A VIDEO SIGNAL TO A PERIOD NOT NECESSARILY AN INTEGER TIMES THE ORIGINAL PERIOD

[75] Inventors: Katuhiko Nishikawa; Kimio Hatajiri, both of Aichi; Yoshinori Onoe, Tokyo, all of Japan

[73] Assignee: Sony Corporation, Tokyo, Japan

[21] Appl. No.: 44,502

[22] Filed: Apr. 9, 1993

[30] Foreign Application Priority Data

Apr. 10, 1992 [JP] Japan .................................. 4-116691

[51] Int. Cl.⁵ ............................................. H04N 7/01
[52] U.S. Cl. .................................................. 348/441
[58] Field of Search ................. 358/140, 11, 160, 181, 358/903, 134; H04N 7/01

[56] References Cited

U.S. PATENT DOCUMENTS

| | | | |
|---|---|---|---|
| 3,941,921 | 3/1976 | Yumde et al. | 358/134 |
| 4,292,652 | 9/1981 | Yumde et al. | 358/134 X |
| 4,573,080 | 2/1986 | Maze | 358/140 |
| 4,680,632 | 7/1987 | Willis et al. | 358/134 X |
| 4,901,148 | 2/1990 | Nakayama et al. | 358/140 |
| 4,935,815 | 6/1990 | Ichikawa et al. | 358/140 |

FOREIGN PATENT DOCUMENTS

| | | | |
|---|---|---|---|
| 0219884 | 11/1985 | Japan | H04N 7/18 |
| 0193379 | 8/1987 | Japan | H04N 7/01 |
| 0046882 | 2/1991 | Japan | H04N 7/01 |

Primary Examiner—Mark R. Powell
Assistant Examiner—John W. Miller
Attorney, Agent, or Firm—Lewis H. Eslinger; Jay H. Maioli

[57] ABSTRACT

A general scanning-period converting device is equipped with two frame memories (first and second frames), and a video signal is written in any one of the frame memories (e.g., first memory) at a scanning period thereof while the video signal is repetitively read out from the other frame memory (e.g., second memory) in accordance with a synchronizing signal having a desired (target) shorter scanning period. When the write-in operation of the first frame memory is finished, the first frame memory is switched so as to carry out a read-out operation from an address thereof corresponding to a read-out address of the second frame memory at the finishing time of the write-in operation thereof, and the second frame memory which has carried out the read-out operation is switched so as to carry out the write-in operation.

1 Claim, 6 Drawing Sheets

APPARATUS FOR CONVERTING THE SCANNING PERIOD OF A VIDEO SIGNAL TO A PERIOD NOT NECESSARILY AN INTEGER TIMES THE ORIGINAL PERIOD

BACKGROUND OF THE INVENTION

1. Field of the Invention

This invention relates to a general scanning-period converting device for converting a scanning period (frequency) of a video signal to another scanning period.

2. Description of Related Art

Conventionally, conversion processing of an original video signal to a video signal having a scanning frequency which is integer times as high as the scanning frequency of the original video signal, such as mode conversion processing between different television systems and image signal conversion processing for multi-image display, etc., has been easily performed even between different types of video signals. Such scanning-period (frequency) conversion processing has been also recently required to convert an original video signal to a video signal having a scanning period which is not necessarily integer times of that of the original video signal, for example in a case where an output character video signal of a computer is composed with a video signal and then the composite video signal is displayed on an exclusive display for the computer. The following two cases are considered as example of the above case. In one case, a video signal of a video source is composed with an output of each of various different kinds of computers, and each composite signal is displayed on an exclusive display for the corresponding computer. In the other case, a video signal of a video source is composed with an output of any one of various different kinds of computers, and the composite signal is selectively displayed on a multi-scan type of display.

In the above cases, in order to treat the original video signal at the same frequency as a currently-connected computer at all times, a different type of scanning-period converter is required in accordance with variation of the video scanning-period of the computer (that is, in accordance with a switching operation for connection with each computer). This requirement is inconvenient and causes the device cost to be high.

SUMMARY OF THE INVENTION

An object of the present invention is to provide a general scanning-period converting device capable of treating video signals having different video scanning periods with only one converter.

According to the general scanning-period converting device of this invention, two frame memories (first and second frames) are provided, and a video signal is written in any one of the frame memories (e.g., first memory) at a scanning period thereof while the video signal is repetitively read out from the other frame memory (e.g., second memory) in accordance with a synchronizing signal having a desired (target) shorter scanning period. When the write-in operation of the first frame memory is finished, the first frame memory is switched so as to carry out a read-out operation from an address thereof corresponding to a read-out address of the second frame memory at the finishing time of the write-in operation thereof, and the second frame memory which has carried out the read-out operation is switched so as to carry out the write-in operation.

According to this invention, during the write-in operation of one-frame data into the first frame memory, the read-out operation is repetitively carried out for the second frame memory. Upon completion of the write-in operation of the first frame memory, even when the read-out operation of the second frame memory is halfway (i.e., has not yet been completed), the read-out operation of the first frame memory for next frame is started from an address of the second frame memory at the time when the write-in operation of the first frame memory is finished. Therefore, the conversion to a video signal having a scanning period which is not integer times of that of an original video signal can be performed.

DETAILED DESCRIPTION OF PREFERRED EMBODIMENTS

Preferred embodiments according to this invention will be described with reference to the accompanying drawings.

Figure 1:
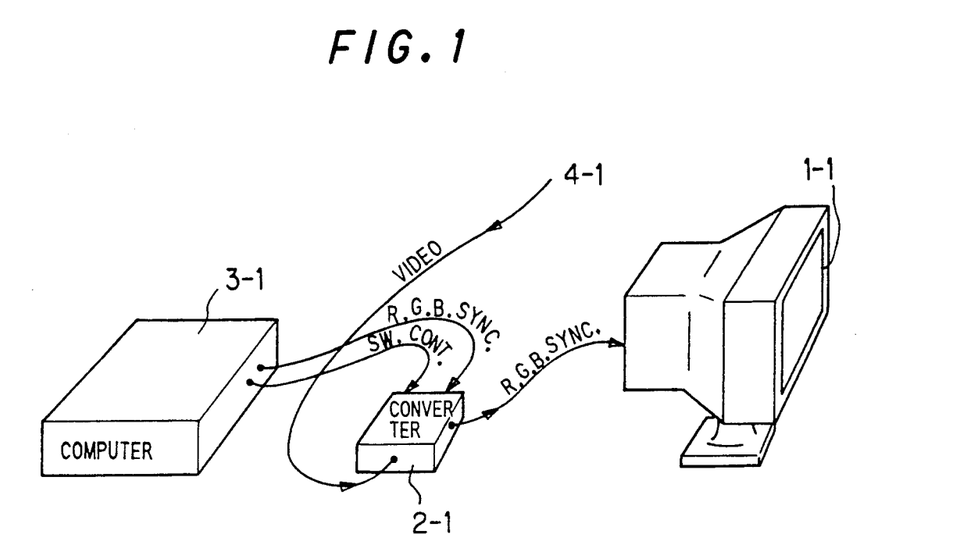
FIG. 1 is a perspective view of a display system in which a general scanning-period converting device according to this invention is used.
Figure 2:
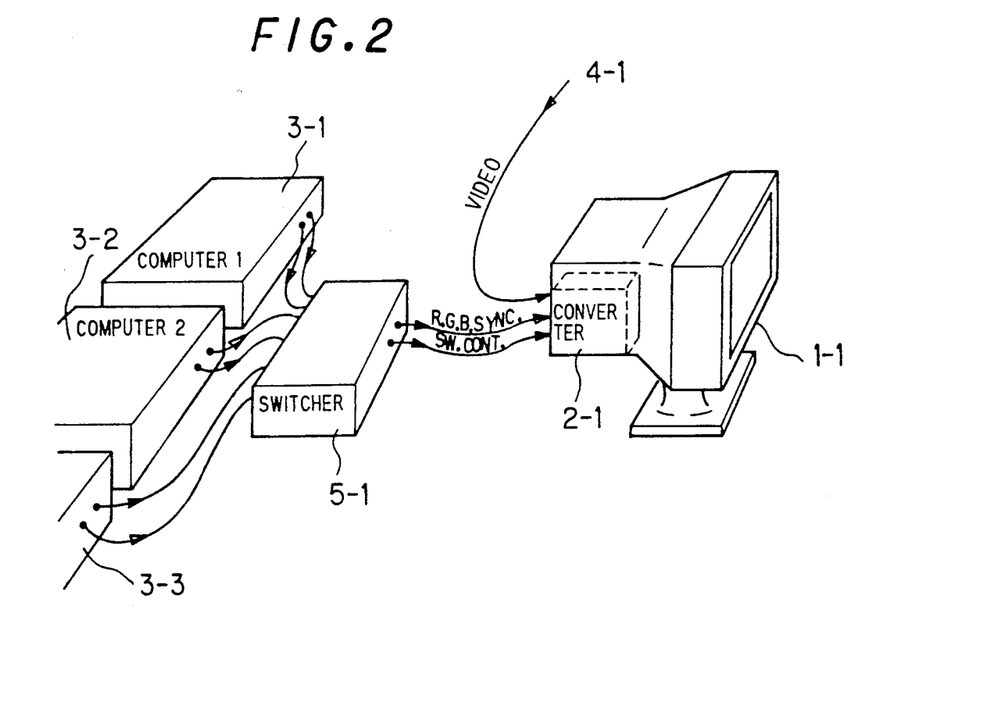
FIG. 2 is a perspective view of another display system in which the general scanning-period converting device according to this invention is used.

FIGS. 1 and 2 are perspective views of display systems in which a general scanning-period converting device according to this invention is used, and these display systems serve as a system for converting an ordinary video signal to a video signal which is matched with video signals having different scanning frequencies, which are output from various kinds of information processing equipments. In FIGS. 1 and 2, a reference numeral 1—1 represents a display device, a reference numeral 2-1 represents a scanning-period converting device of this invention, reference numerals 3-1 to 3—3 represent different kinds of computers, a reference numeral 4-1 represents a video source, and a reference numeral 5-1 represents a signal switcher.

FIG. 1 shows the system for compositely displaying a video signal on each of exclusive display devices for various kinds of computers, and FIG. 2 shows the system for compositely displaying a video signal on a multi-scan type display device for plural computers. These systems are effectively used particularly to insert a video signal onto a character frame of a computer or to generate a video signal which is matched with a synchronizing signal of a computer or the like.

Figure 3:
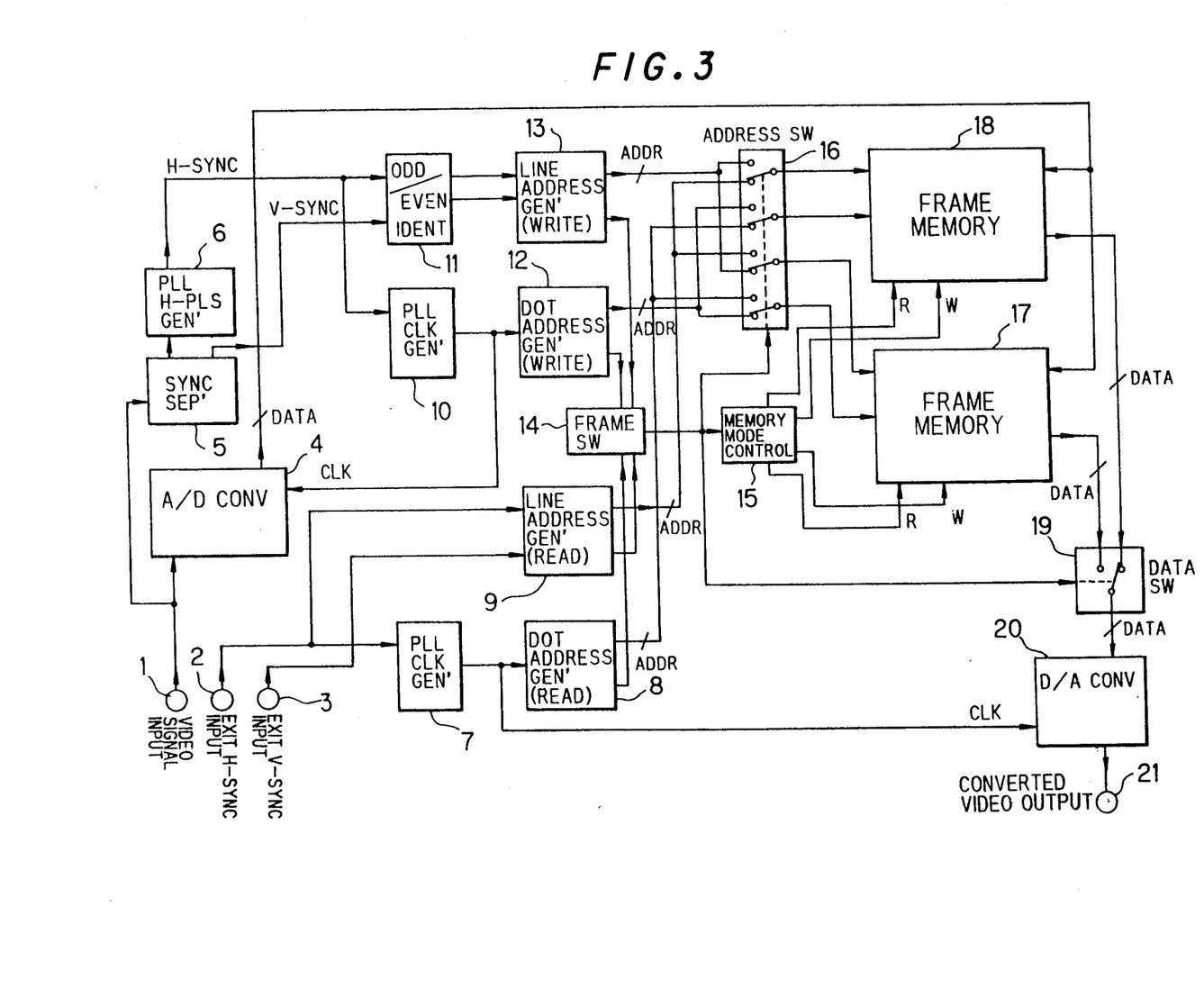
FIG. 3 is a block diagram showing an embodiment of the scanning-period converting device according to this invention.

FIG. 3 is a block diagram showing an embodiment of the general scanning-period converting device according to this invention, and shows the construction of a converter for a video signal of any one of three channels for R, G and B. In FIG. 3, a reference numeral 1 represents a video signal input terminal, reference numerals 2 and 3 represent external horizontal and vertical synchronizing signal input terminals respectively, a reference numeral represents an A/D converter, a reference numeral 5 represents a synchronization separating circuit, a reference numeral 6 represents a PLL oscillator for generating a horizontal synchronizing signal, a reference numeral 7 represents a PLL oscillator for generating a read-out clock, a reference numeral 8 represents a read-out dot address generator, a reference numeral 11 represents an even/odd field identification circuit, a reference numeral 12 represents a write-in dot address generator, a reference numeral 13 represents a write-in line address generator, a reference numeral 14 represents a frame switch, a reference numeral 15 represents a memory mode control circuit, a reference numeral 16 represents an address switch, reference numerals 17 and 18 represent frame memories, a reference numeral 19 represents a data switch, a reference numeral 20 represents a D/A converter, and a reference numeral 21 represents an output terminal.

The operation of the general scanning-period converting device of this embodiment will be hereunder described.

The write-in operation will be first described.

A video signal whose scanning period is required to be converted is input to the input terminal 1, and synchronizing signals which are matched with a timing of a desired scanning period after the conversion are input to the external input terminals 2 and 3. The input video signal is supplied to the frame memories 17 and 18, and a part of the video signal is supplied to the synchronization separating circuit 5. A horizontal synchronizing signal separated in the synchronizing separation circuit 5 is input to the PLL oscillator 6 to generate a timely-stable horizontal pulse having no noise and no jitter. In addition, a vertical synchronizing signal separated in the synchronizing separation circuit 5 is also input to the even/odd field identification circuit 11 to make an even/odd field identification and to generate a write-in address so that picture elements on each line in even and odd fields are stored in an accurate arrangement into the frame memories 17 and 18.

The horizontal pulse is also applied to the PLL oscillator 10 for generating the write-in clock to generate a dot-address generating clock in a horizontal direction, whereby the phase of the dots in the horizontal direction to the horizontal synchronizing signal is matched over all horizontal lines. The write-in dot address generator 12 generates dot addresses in each line in accordance with the clock of the PLL oscillator 10, and the write-in line address generator 13 receives the identification output from the even/odd field identification circuit 11 to generate a line address in one frame every horizontal pulse. At the same time, the clock from the PLL oscillator 10 is applied to the A/D converter 4 for the input video signal, so that the write-in dot and the digitalized picture-element signal are synchronized with each other.

Next, the read-out operation of the general scanning-period converting device will be described.

The device is so designed that the read-out operation is started from the frame memory in which no write-in operation is carried out, and the read-out operation is carried out so as to successively read out lines and dots of a frame from the head thereof. The number of picture elements on a horizontal line, that is, a dot number is dependent on the write-in operation. However, the scanning frequency in the read-out operation is set to be higher than that in the write-in operation, that is, it is set so as to be up-converted. Therefore, the read-out clock frequency is heightened.

The external horizontal synchronizing signal input to the external input terminal 2 is applied to the PLL oscillator 7 for generating the read-out clock to supply the read-out dot address generator 8 with a clock which is generated in the same division ratio as the PLL oscillator 10 for generating the write-in clock. The external horizontal synchronizing signal is applied to the read-out line address generator 9 together with the vertical synchronizing signal input to the external input terminal 3 to generate an address for each horizontal line. In this embodiment, the read-out operation is carried out in a non-interlace mode, and thus the even/odd fields are not discriminated from each other. The clock of the PLL oscillator 7 is applied to the D/A converter 20 as well as the dot address generator 8, whereby the data of the frame memory at the read-out time is converted to analog signals.

The digital data which is read out from the frame memory is passed through the data switch 19 and supplied to the D/A converter 20 whose conversion period is determined by the same clock as the read-out clock to convert the digital data to the analog signals. The analog signals after the conversion are output to the output terminal 21 as a video signal after the scanning period is converted.

The write-in and read-out operations of the frame memory will be hereunder described.

Each of the frame memories 17 and 18 alternately carries out the write-in and read-out operations repetitively. The state as shown in FIG. 3 shows that the frame memory 17 carries out "write-in operation" while the frame memory 18 carries out "read-out operation". The switching operation between the write-in and read-out operations is carried out while the frame switch 14 monitors the write-in address, and it is carried out at the time when the write-in operation is finished. Therefore, the switching operation is carried out in a write-in priority mode. That is, on the basis of the output of the frame memory switch 14 in accordance with the end of the write-in address, the memory mode control circuit 15 is driven to switch the mode of each frame memory, then the address switch 16 is changed-over to switch an address to be supplied to each frame memory in accordance with the switching of the mode, and then the data switch 19 is switched to synchronously read out the outputs of the frame memories which are alternately read out.

Figure 4:
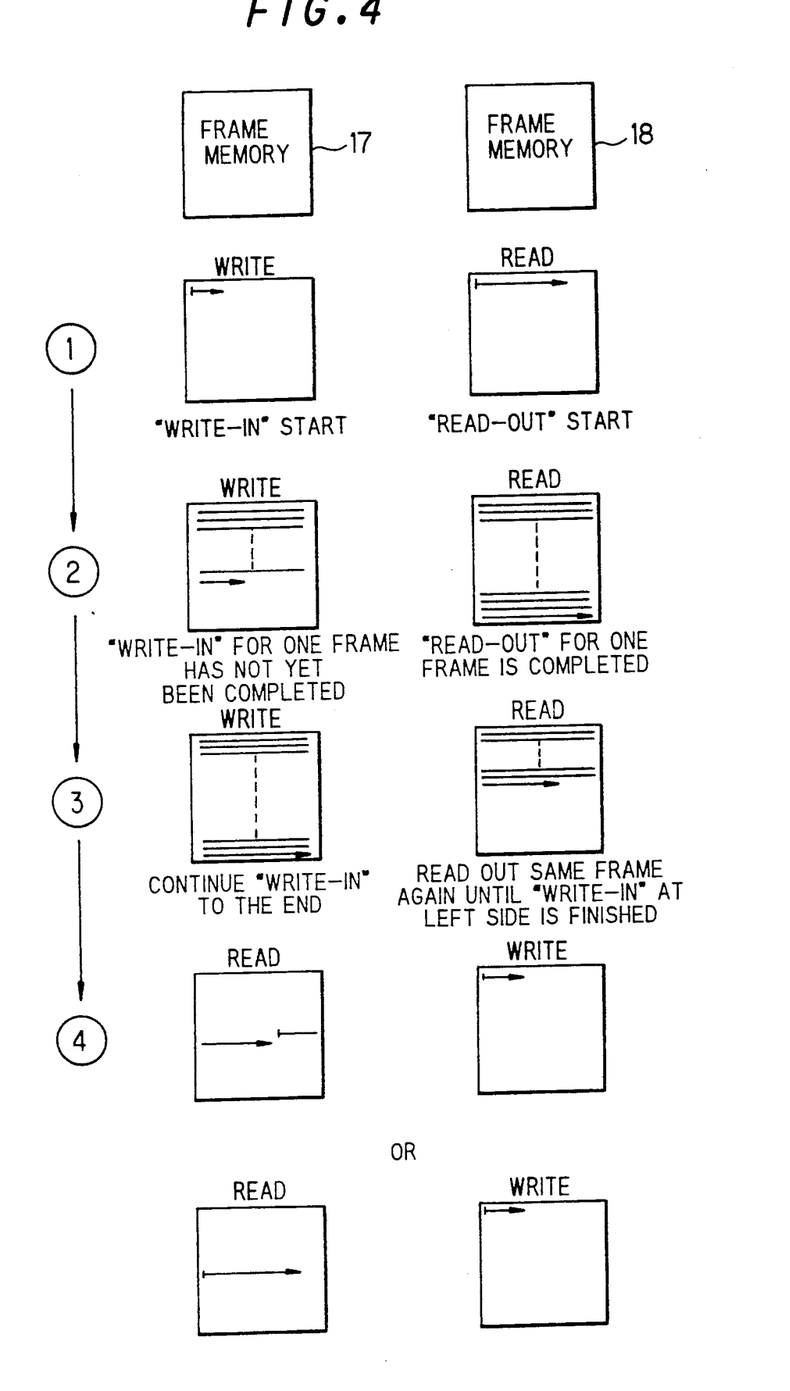
FIG. 4 is a schematic view showing the principle of the scanning-period conversion of this invention.

According to the above construction, the video signal input to the input terminal 1 is converted to a video signal having a desired or target scanning period, and the principle of this conversion operation will be described in detail with reference to FIG. 4.

It is assumed that the frame memory 17 is in "write-in" mode and the frame memory 18 is in "read-out" mode. The "write-in" is carried out with the input video signal and the "read-out" is carried out with a synchronizing signal having a shorter scanning period from a computer or the like.

At a step (1), the "write-in" of the memory 17 and the "read-out" of the memory 18 are started. At a step (2), the "read-out" of the memory 18 for one frame is finished, but the "write-in" of the memory 17 has not yet been finished. At a step (3), the "write-in" of the memory 17 is continued to the end because it is carried out in the write-in priority mode, and in the memory 18 the "read-out" is carried out again for the same frame until the "write-in" of the memory 17 is finished.

At a step (4), the memory mode is changed over, and the change-over of the memory mode is carried out by the following two methods.

(1) At the time when the "write-in" of the memory 17 at the step (3) is finished, it is altered to the "write-in" of the memory 18. At this time, the "read-out" of the memory 17 is started from an address just subsequent to a dot address at which the "read-out" of the memory 18 is ceased.

(2) At the time when the "write-in" of the memory 17 at the step (3) is finished, the "read-out" is continued for a line for which the "read-out" of the memory 18 is being carried out, and the "write-in" of the memory 18 is started after the "read-out" of the memory 18 for the line is finished. At this time, the "read-out" of the memory 17 is started from a line just subsequent to the line for which the "read-out" of the memory 18 is finished.

Through the repetitive operation as described above, the conversion to the desired or target scanning period can be performed.

Here, as described in (1) of the step (4), if the switching timing of the read-out frame is set in the middle of a line, there would occur a case where a switch noise appears in an output video signal. Therefore, as described in (2) of the step (4), the switching operation is carried out at the time when the "read-out" line is finished, that is, during a horizontal flyback period, thereby preventing the switch noise to appear in the video signal.

According to the conversion principle as described above, the conversion in the number of scanning lines can be carried out only between the numbers of scanning lines which have integer-times relationship therebetween. Therefore, when the numbers of scanning lines in a vertical scanning period are not in an integer-times relationship, a head value and an end value of the read-out address may be set to make them the integer-times relationship. In this case, a part of an original video frame is hidden, however, by making the read-out address programmable, a read-out part of the original video frame is set to be variable to thereby avoid the above inconvenience.

Further, in the above conversion operation, if the "write-in" operation is stopped, the "read-out" operation at the frame memory side which carries out the "read-out" is continued to enable a picture to be frozen.

Figure 5:
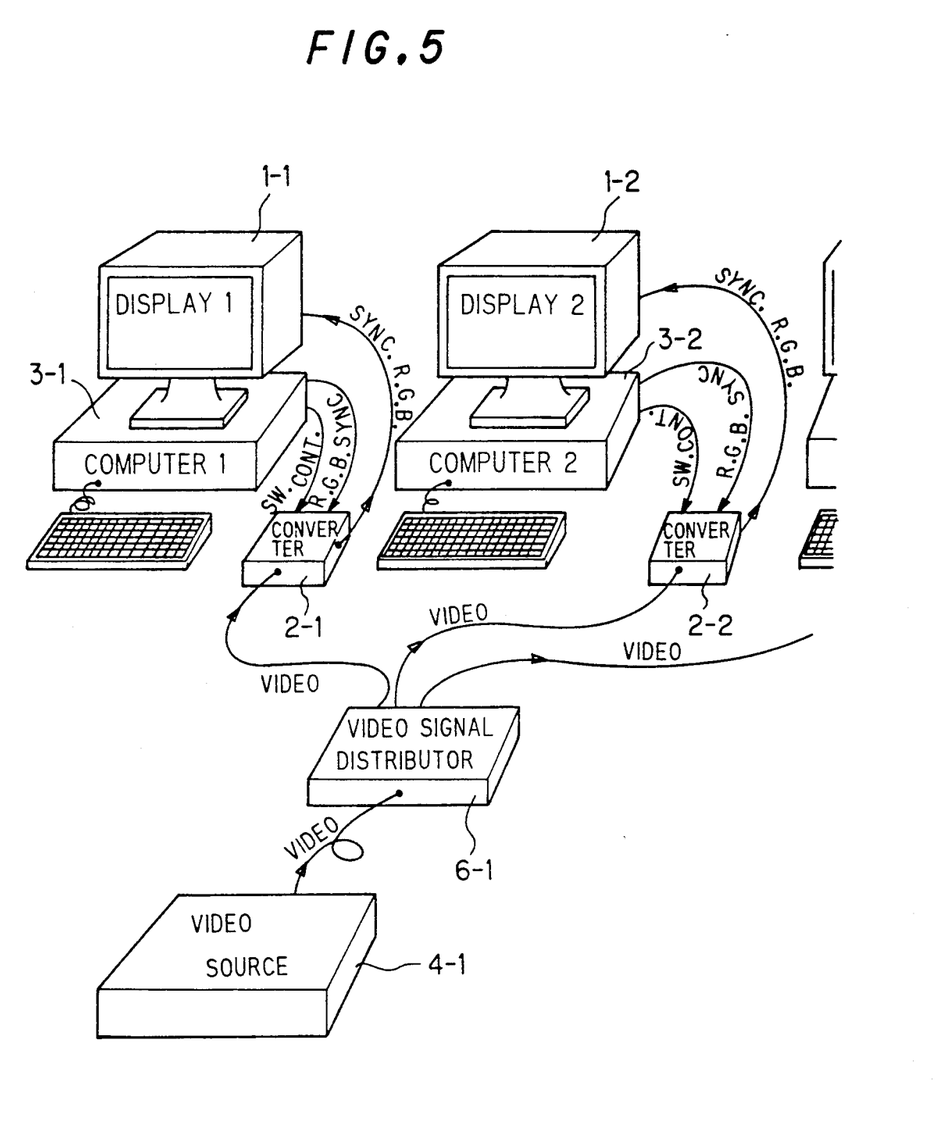
FIG. 5 is a schematic view of a system in which the general scanning-period converting device of this invention is applied as a separate equipment.
Figure 6:
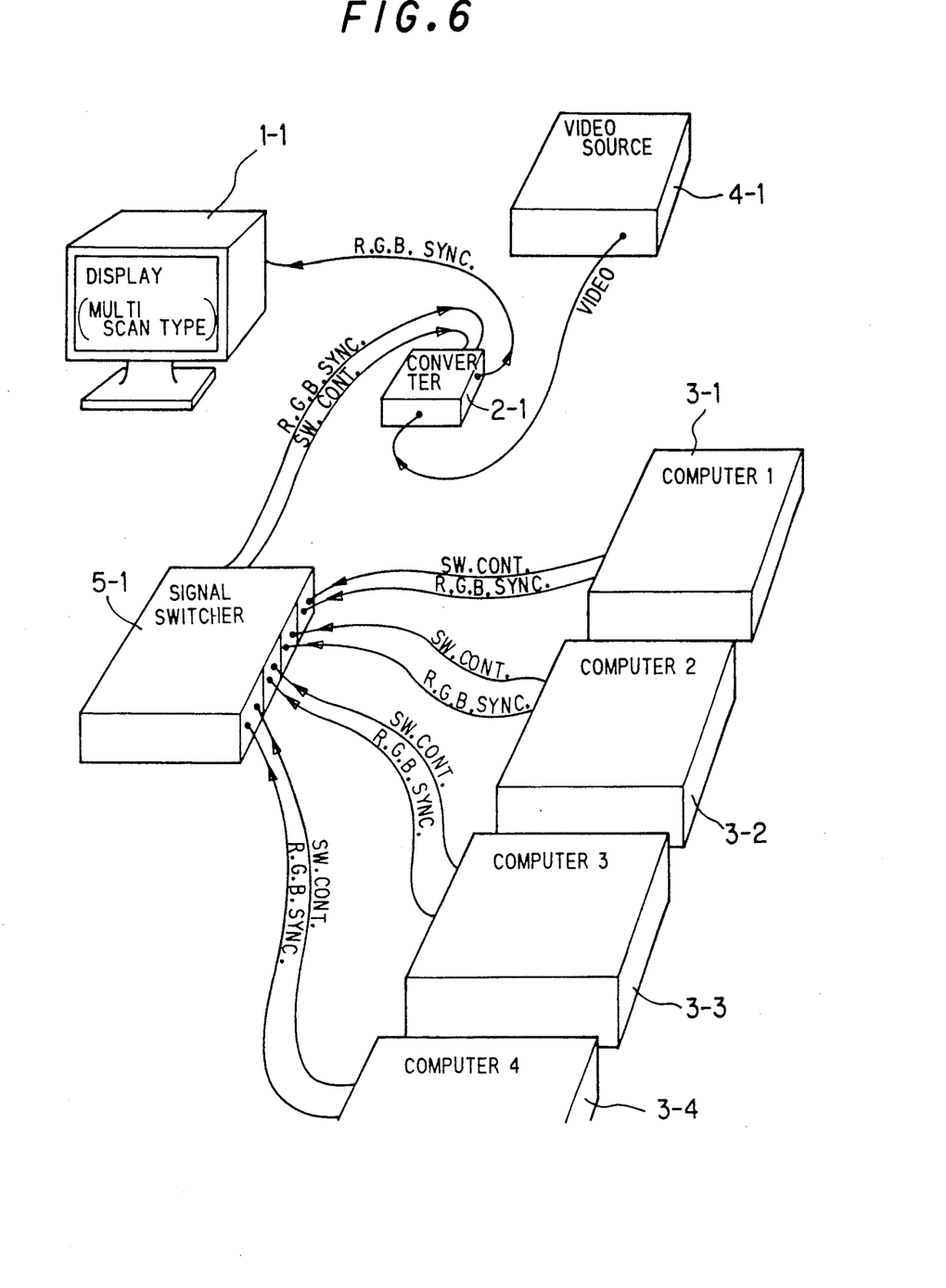
FIG. 6 is a schematic view of another system in which the general scanning-period converting device of this invention is applied as a separate equipment.

FIGS. 5 and 6 are schematic views of systems in which the general scanning-period converting device of this invention is applied as a separate equipment.

In the system as shown in FIG. 5, a video signal from a video source 4-1 is divided into plural signals by a video signal distributor 6-1, and each of the signals is composited with each output of plural different kinds of computers 3-1, 3-2, . . . using the general scanning-period converting devices 2-1, 2—2, . . . to thereby display each composite signal on each of display devices 1—1, 1-2, . . . for each computer.

In the system as shown in FIG. 6, a video signal of a video source 4-1 is composited with any one of outputs of plural different kinds of computers 3-1, 3-2, 3—3, 3-4, . . . which is selected by a signal switcher 5-1 using the general scanning-period converting device 2-1, thereby selectively displaying each composite signal on a multichannel scan type of display 1—1.

Figure 7:
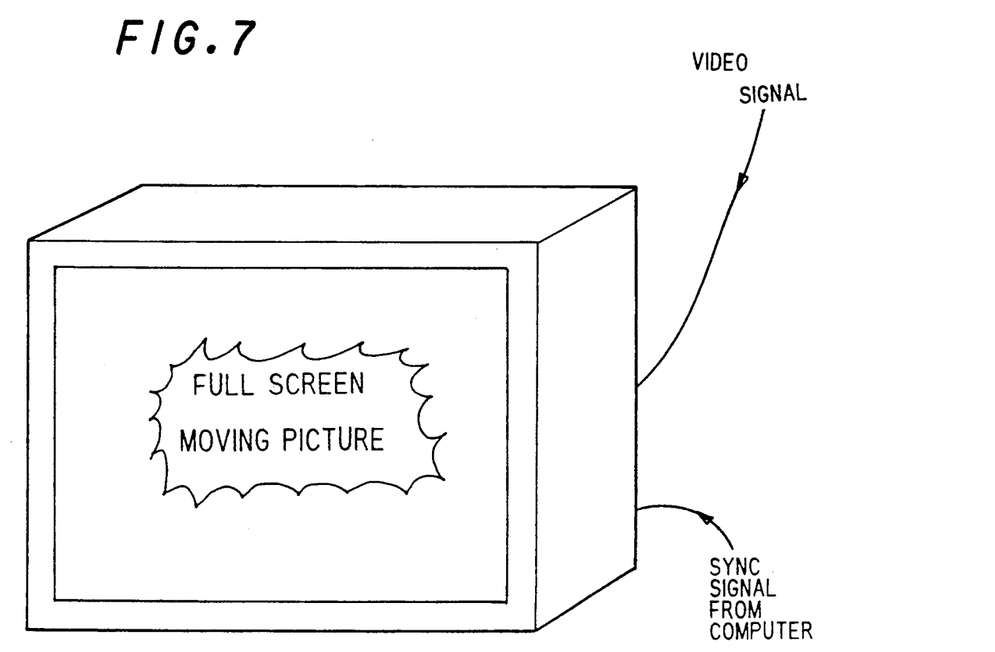
FIG. 7 shows a display example of an image on a display frame.
Figure 8:
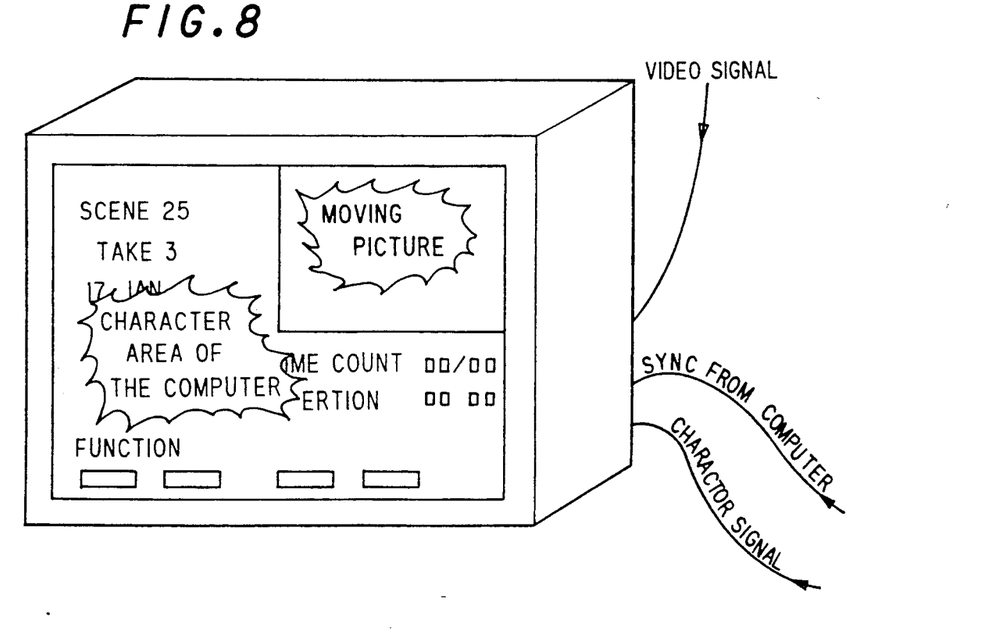
FIG. 8 shows another display example of the image on the display frame.

FIGS. 7 and 8 show examples of display images on a display frame in the above systems, and it is easily carried out to selectively display any one of video images on a computer display through a switching operation or display a video image on a display while inserted into a frame.

With the above construction, "picture-in-picture" display and "cut-out frame" display can be performed, and thus the general scanning-period converting device according to this invention is applicable to a multimedia system in various modes.

According to the general scanning-period converting device of this invention, not only an original video signal is converted to a video signal having scanning frequency which is integer times of that of the original video signal, but also the original video signal can be converted to a video signal having any higher scanning frequency than that of the original video signal, and using a single converter, the scanning period of the original video signal can be matched with that of each of equipments in which various video signals having different scanning frequency are treated.

What is claimed is:

1. Apparatus for converting the scannng period of video signal, comprising:
   two frame buffer means each for storing a frame of video data;
   write-in means for executing a write-in operation including receiving a video signal having a first scanning period and generating a write-in address in accordance with the first scanning period to write a frame of video data from the video signal into one of said frame buffer means;
   read-out means for executing a repetitive read-out operation on a frame-by-frame basis including receiving a synchronizing signal having a second scanning period shorter than the first scanning period and generating a read-out address in accordance with the second scanning period to repetitively read out the video data from the other of said frame buffer means; and
   control means for controlling the operations of said read-out means and said write-in means so that when the write-in operation of said write-in means writing data to the one of said frame buffer means is finished, the read-out operation of said read-out means reading data from the other of said frame buffer means is also terminated, and subsequently the read-out operation of said read-out means to read data from the one of said frame buffer means is started from an address corresponding to a read-out address of the other of said frame buffer means at the finishing time of the write-in operation of the one of the said frame buffer means while the write-in operation of said write-in means to write data to the other of said frame buffer means is started.

* * * * *

UNITED STATES PATENT AND TRADEMARK OFFICE
CERTIFICATE OF CORRECTION

PATENT NO. : 5,309,233
DATED : May 3, 1994
INVENTOR(S) : Katuhiko Nishikawa, Kimio Hatajiri and Yoshinori Onoe It is certified that error appears in the above-indentified patent and that said Letters Patent is hereby corrected as shown below:

Col. 1, line 31, change "example" to --examples--
Col. 6, line 5, change "3--3" to --3-3--

In the Claims:
Col. 6, line 33, after "of" insert --a--
line 63, delete "the" first occurrence Signed and Sealed this Sixth Day of June, 1995

Attest:

BRUCE LEHMAN

Attesting Officer

Commissioner of Patents and Trademarks